(12) United States Patent
Hariharan et al.

(10) Patent No.: US 12,445,384 B2
(45) Date of Patent: *Oct. 14, 2025

(54) REAL-TIME PROCESSING IN WIRELESS COMMUNICATIONS SYSTEMS

(71) Applicant: Altiostar Networks, Inc., Tewksbury, MA (US)

(72) Inventors: Raghunath Hariharan, Boston, MA (US); Kiran Kumar Jakkur Srinivasa Murthy, Bangalore (IN)

(73) Assignee: Altiostar Networks, Inc., Tewksbury, MA (US)

( * ) Notice: Subject to any disclaimer, the term of this patent is extended or adjusted under 35 U.S.C. 154(b) by 276 days.

This patent is subject to a terminal disclaimer.

(21) Appl. No.: 17/915,010

(22) PCT Filed: Jul. 19, 2021

(86) PCT No.: PCT/US2021/042216
§ 371 (c)(1),
(2) Date: Sep. 27, 2022

(87) PCT Pub. No.: WO2022/020251
PCT Pub. Date: Jan. 27, 2022

(65) Prior Publication Data
US 2023/0155944 A1    May 18, 2023

Related U.S. Application Data

(63) Continuation of application No. 16/933,738, filed on Jul. 20, 2020, now Pat. No. 11,438,273.

(51) Int. Cl.
*H04L 47/2416* (2022.01)
*H04L 12/46* (2006.01)
(Continued)

(52) U.S. Cl.
CPC ...... *H04L 47/2416* (2013.01); *H04L 12/4641* (2013.01); *H04L 47/28* (2013.01); *H04L 47/32* (2013.01); *H04W 88/085* (2013.01)

(58) Field of Classification Search
CPC . H04L 47/2416; H04L 12/4641; H04L 47/28; H04L 47/32; H04W 88/085
See application file for complete search history.

(56) References Cited

U.S. PATENT DOCUMENTS 6,278,710 B1    8/2001    Eidson
9,608,767 B2    3/2017    Liu et al.
(Continued)

FOREIGN PATENT DOCUMENTS

CN    111867073 A      10/2020
EP       2979408 A2 *   2/2016   ............. H04L 45/30

OTHER PUBLICATIONS

International Search Report and Written Opinion, mailed Nov. 17, 2021, International Patent Application No. PCT/US2021/042216, filed Jul. 19, 2021.

*Primary Examiner* — Samina F Choudhry
(74) *Attorney, Agent, or Firm* — Sughrue Mion, PLLC

(57) ABSTRACT

A method, an apparatus, and a computer program product for real-time processing in wireless communications systems. An interruption of processing of one or more first symbol packets at one or more wireless communication components is detected. A predetermined period of time for a delay in processing of one or more second symbol packets is determined. Processing of one or more second symbol packets is delayed until expiration of the predetermined period of time. Processing of one or more second symbol packets is then performed.

13 Claims, 18 Drawing Sheets

(51) Int. Cl.
*H04L 47/28* (2022.01)
*H04L 47/32* (2022.01)
*H04W 88/08* (2009.01)

(56) References Cited

U.S. PATENT DOCUMENTS

| | | |
|---|---|---|
| 10,645,718 B2 | 5/2020 | Kim et al. |
| 11,438,273 B2 | 9/2022 | Harihan et al. |
| 2003/0145097 A1 | 7/2003 | Connor et al. |
| 2004/0071194 A1 | 4/2004 | Suwa et al. |
| 2005/0053024 A1 | 3/2005 | Friedrich |
| 2006/0235732 A1 | 10/2006 | Miller et al. |
| 2010/0265917 A1* | 10/2010 | Kezys .............. H04W 36/02 370/331 |
| 2010/0329185 A1 | 12/2010 | Hsu |
| 2011/0075582 A1 | 3/2011 | Sugiyama et al. |
| 2014/0004841 A1 | 1/2014 | Morad et al. |
| 2014/0043998 A1 | 2/2014 | Wang et al. |
| 2015/0043390 A1 | 2/2015 | Wang et al. |
| 2015/0156714 A1 | 6/2015 | Xia |
| 2015/0334701 A1 | 11/2015 | Agardh et al. |
| 2015/0365872 A1 | 12/2015 | Dudda et al. |
| 2015/0373563 A1 | 12/2015 | Chou |
| 2016/0344642 A1 | 11/2016 | Brisebois et al. |
| 2017/0245311 A1 | 8/2017 | Murray et al. |
| 2017/0325120 A1 | 11/2017 | Szilagyi et al. |
| 2018/0249375 A1 | 8/2018 | Goldhamer |
| 2018/0310247 A1 | 10/2018 | Chu et al. |
| 2019/0036789 A1 | 1/2019 | Kaplunov et al. |
| 2019/0075023 A1 | 3/2019 | Sirotkin |
| 2019/0205164 A1 | 7/2019 | Kumar et al. |
| 2019/0319686 A1 | 10/2019 | Chen et al. |
| 2019/0364492 A1 | 11/2019 | Azizi et al. |
| 2019/0373666 A1 | 12/2019 | Khan |
| 2019/0394658 A1 | 12/2019 | Baillargeon |
| 2020/0022077 A1 | 1/2020 | Sofuoglu et al. |
| 2020/0110627 A1 | 4/2020 | Chou et al. |
| 2020/0151002 A1 | 5/2020 | Paveza et al. |
| 2020/0192725 A1 | 6/2020 | Feldkamp |
| 2020/0220805 A1 | 7/2020 | Dhanabalan |
| 2020/0229206 A1 | 7/2020 | Badic et al. |
| 2020/0280518 A1 | 9/2020 | Lee et al. |
| 2021/0014157 A1 | 1/2021 | Zhou |
| 2021/0084599 A1 | 3/2021 | Kim et al. |
| 2021/0105762 A1 | 4/2021 | Pezeshki et al. |

* cited by examiner

REAL-TIME PROCESSING IN WIRELESS COMMUNICATIONS SYSTEMS

CROSS-REFERENCE TO RELATED APPLICATIONS

The present application claims priority to and is the 35 U.S.C. 371 United States National Phase application based on International Patent Application No. PCT/US21/42216, filed on Jul. 19, 2021, entitled "REAL-TIME PROCESSING IN WIRELESS COMMUNICATIONS SYSTEMS," which claims priority to U.S. patent application Ser. No. 16/933,738 (now U.S. Pat. No. 11,438,273), filed on Jul. 20, 2020, entitled "REAL-TIME PROCESSING IN WIRELESS COMMUNICATIONS SYSTEMS," which are hereby incorporated by reference in their entireties.

TECHNICAL FIELD

In some implementations, the current subject matter relates to telecommunications systems, and in particular, to real-time processing in wireless communications systems, such as, for example, 5G New Radio ("NR").

BACKGROUND

In today's world, cellular networks provide on-demand communications capabilities to individuals and business entities. Typically, a cellular network is a wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide improved service within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if when mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile; in rural areas, the range can be as much as 5 miles; and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. A 5G LTE standard is currently being developed and deployed. LTE is based on the GSM/EDGE and UMTS/HSPA digital cellular technologies and allows for increasing capacity and speed by using a different radio interface together with core network improvements.

Deploying multiple real-time workloads in a virtualized/containerized environment on a single non-uniform memory access node in a wireless communications system has its challenges in the workload being able to meet its real-time requirements. Shared resources in the underlying processor (CPU) result in resource contention for Last Level Cache (LLC) and memory bandwidth consumption where in one workload can occupy more than the required amount of such resources. This results in one of the workloads being unable to meet its real-time requirements and affects the performance of the product/application requiring the application to experience a restart and the associated service to undergo a service downtime. Typically, such class of problems are classified as "noisy neighbor" problems. These problems reduce overall service availability and reliability of real-time workloads in wireless communication systems.

SUMMARY

In some implementations, the current subject matter relates to a computer implemented method for real-time processing in wireless communications systems. The method can include detecting an interruption of processing of one or more first symbol packets at one or more wireless communication components, determining a predetermined period of time for a delay in processing of one or more second symbol packets, delaying processing of the one or more second symbol packets until expiration of the predetermined period of time, and performing processing of the one or more second symbol packets.

In some implementations, the current subject matter can include one or more of the following optional features. In some implementations, at least one of the detecting, the determining, the delaying, and the resuming can be performed by a base station. The base station can include at least one of the following communication components: one or more remote radio units, one or more radio interface units, and one or more distributed units. The distributed units can be configured to interface with the radio interface units for processing of the first and second symbol packets.

In some implementations, the distributed units can be one or more virtualized distributed units. The virtualized distributed units can correspond to one or more virtual machines being executed on a host operating system.

In some implementations, a first virtual machine can be configured to detect the interruption upon a restarting of a second virtual machine on the same host operating system.

In some implementations, the predetermined period of time can be determined based on a multiple of a transmission time interval corresponding to a time for transmitting symbol packets between the virtualized distributed units and the radio interface units. For example, the predetermined period of time can be 2 milliseconds. Alternatively, the predetermined period of time can be 5 milliseconds. In some implementations, the predetermined period of time can be N milliseconds (during which monitoring, detection and correction without service disruption may be performed), where N can correspond to an amount of time after which the end user equipment can begin to notice service degradation and/or service interruption. In some exemplary, non-limiting implementations, N can be as high as hundreds (100 s) of milliseconds.

In some implementations, the delaying can include de-queuing the first symbol packets from a processing queue. The first symbol packets can be de-queued and discarded by at least one of Layer 1 and Layer 2 of a wireless communication device receiving the first symbol packets.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1b illustrates further detail of the exemplary LTE system shown in FIG. 1a;

FIG. 1c illustrates additional detail of the evolved packet core of the exemplary LTE system shown in FIG. 1a;

FIG. 1d illustrates an exemplary evolved Node B of the exemplary LTE system shown in FIG. 1a;

DETAILED DESCRIPTION

The current subject matter can provide for systems and methods that can be implemented in lower layer split architecture for wireless communications systems. Such systems can include various wireless communications systems, including 5G New Radio communications systems, long term evolution communication systems, etc.

One or more aspects of the current subject matter can be incorporated into transmitter and/or receiver components of base stations (e.g., gNodeBs, eNodeBs, etc.) in such communications systems. The following is a general discussion of long-term evolution communications systems and 5G New Radio communication systems.

I. Long Term Evolution Communications System

FIGS. 1a-c and 2 illustrate an exemplary conventional long-term evolution ("LTE") communication system 100 along with its various components. An LTE system or a 4G LTE, as it is commercially known, is governed by a standard for wireless communication of high-speed data for mobile telephones and data terminals. The standard is based on the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard was developed by the 3GPP ("3rd Generation Partnership Project").

Figure 1A:
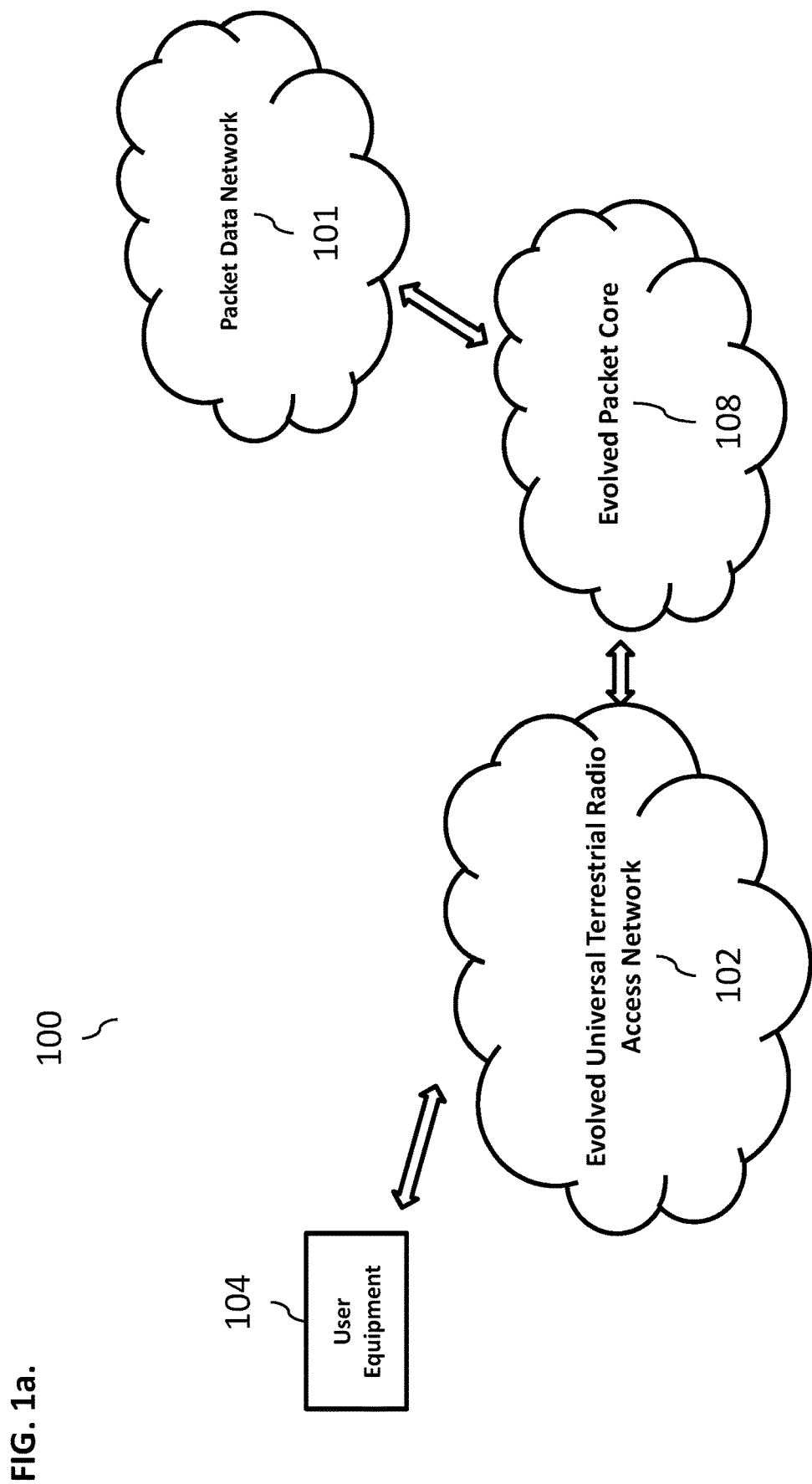
FIG. 1a illustrates an exemplary conventional long term evolution ("LTE") communications system.
Figure 1B:
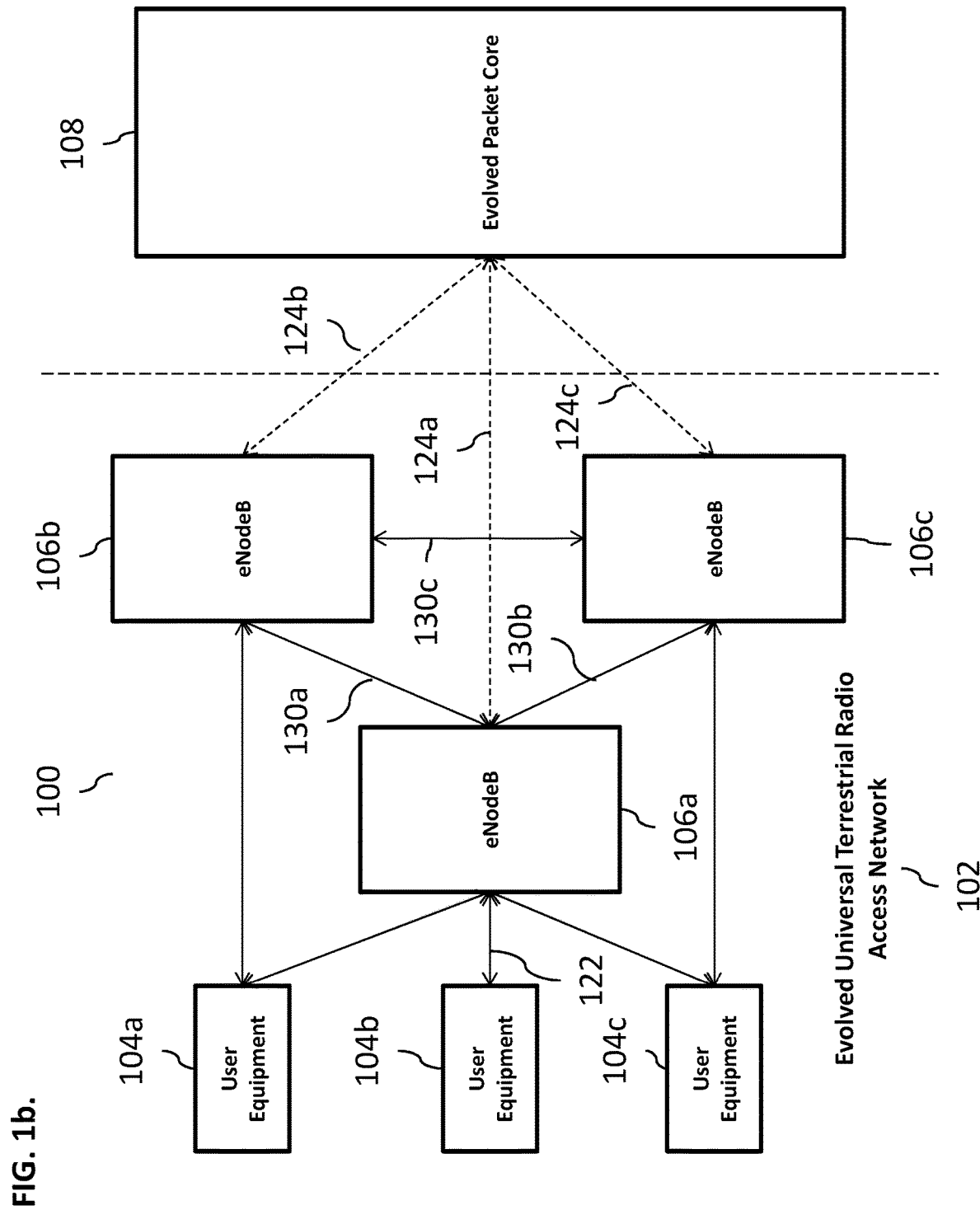

As shown in FIG. 1a, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (a, b, c) (as shown in FIG. 1b) that provide communication capabilities to a plurality of user equipment 104(a, b, c). The user equipment 104 can be a mobile telephone, a smartphone, a tablet, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1C:
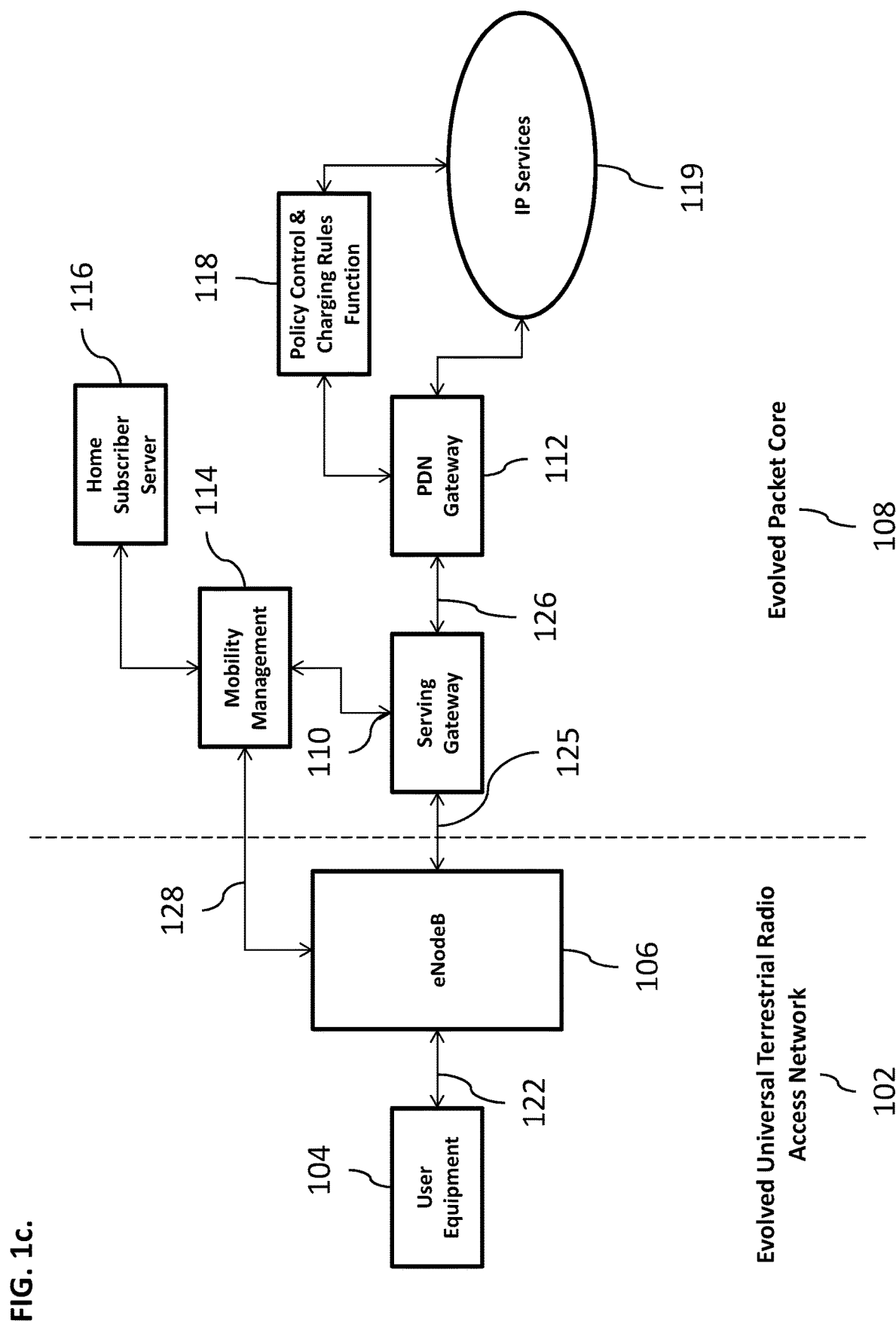

FIG. 1b illustrates further detail of the network 100 shown in FIG. 1a. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMEs, as shown in FIG. 1c) will serve the user equipment 104 and for protocol features like header compression and encryption. The eNodeBs 106 that make up an EU IRAN 102 collaborate with one another for radio resource management and handover.

Communication between the user equipment 104 and the eNodeB 106 occurs via an air interface 122 (also known as "LTE-Uu" interface). As shown in FIG. 1b, the air interface 122 provides communication between user equipment 104b and the eNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1c). In addition to signaling, user traffic is transferred between the user equipment 104 and eNodeB 106. Both signaling and traffic in the system 100 are carried by physical layer ("PITY") channels.

Multiple eNodeBs 106 can be interconnected with one another using an X2 interface 130(a, b, c). As shown in FIG. 1a, X2 interface 130a provides interconnection between eNodeB 106a and eNodeB 106b; X2 interface 130b provides interconnection between eNodeB 106a and eNodeB 106c; and X2 interface 130c provides interconnection between eNodeB 106b and eNodeB 106c. The X2 interface can be established between two eNodeBs in order to provide an exchange of signals, which can include a load- or interference-related information as well as handover-related information. The eNodeBs 106 communicate with the evolved packet core 108 via an S1 interface 124(a, b, c). The S1 interface 124 can be split into two interfaces: one for the control plane (shown as control plane interface (S1-MME interface) 128 in FIG. 1c) and the other for the user plane (shown as user plane interface (S1-U interface) 125 in FIG. 1c).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to interwork with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1c. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1a). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMES in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QoS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1a).

Figure 1D:
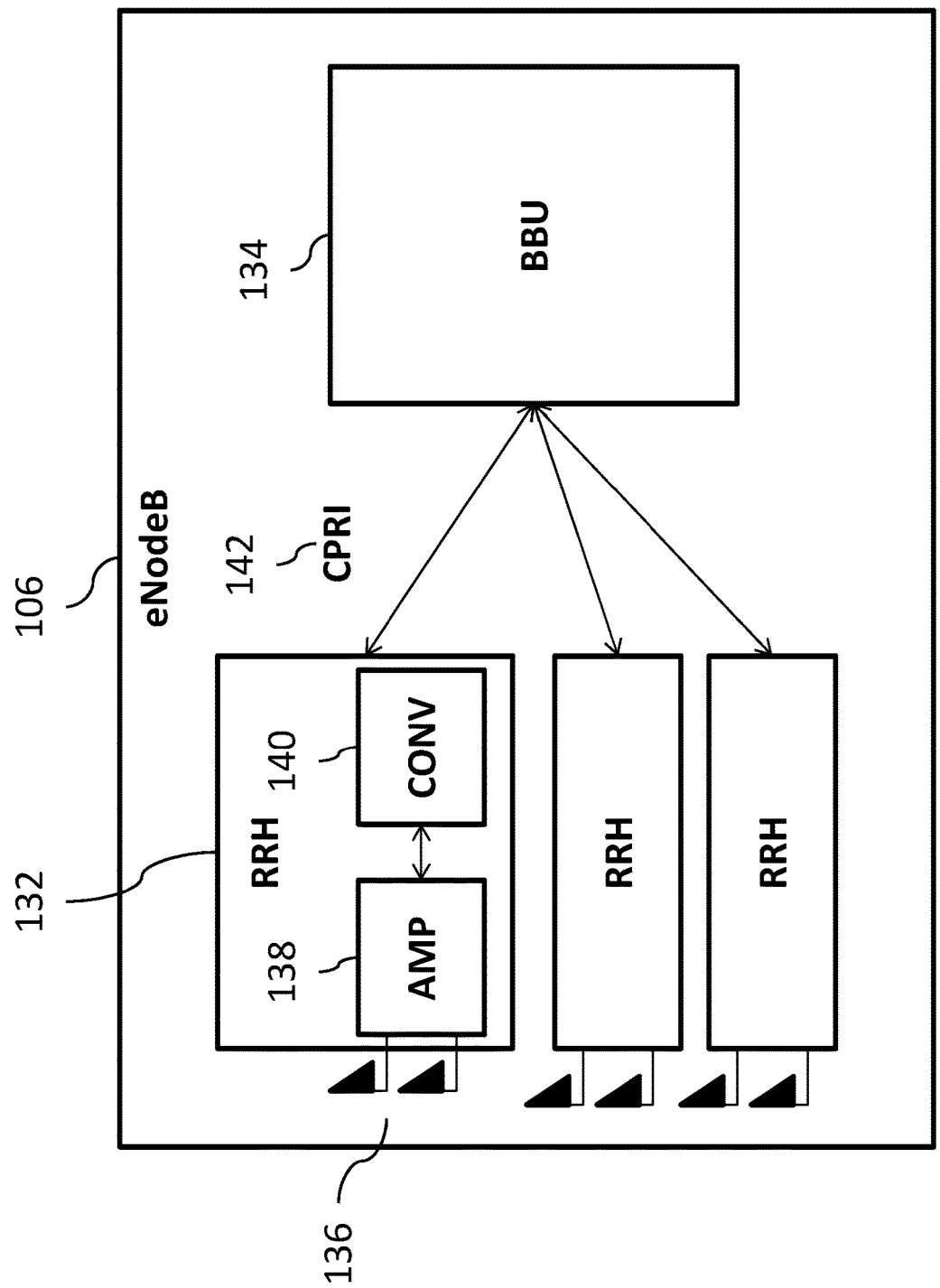

FIG. 1d illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI") 142 standard specification. The operation of the eNodeB 106 can be characterized using the following standard parameters (and specifications): radio frequency band (Band4, Band9, Band17), bandwidth (5, 10, 15, 20 MHz), access scheme (downlink: OFDMA; uplink: SC-OFDMA), antenna technology (downlink 2×2 MIMO; uplink: 1×2 single input multiple output ("SIMO")), number of sectors (6 maximum), maximum transmission power (60 W), maximum transmission rate (downlink 150 Mb/s; uplink: 50 Mb/s), S1/X2 interface (1000Base-SX, 1000Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1d) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1d). Conversely, the RF signals that are received from user equipment 104 are amplified (using AMP 138) and converted (using CONV 140) to digital baseband signals for transmission to the BBU 134.

Figure 2:
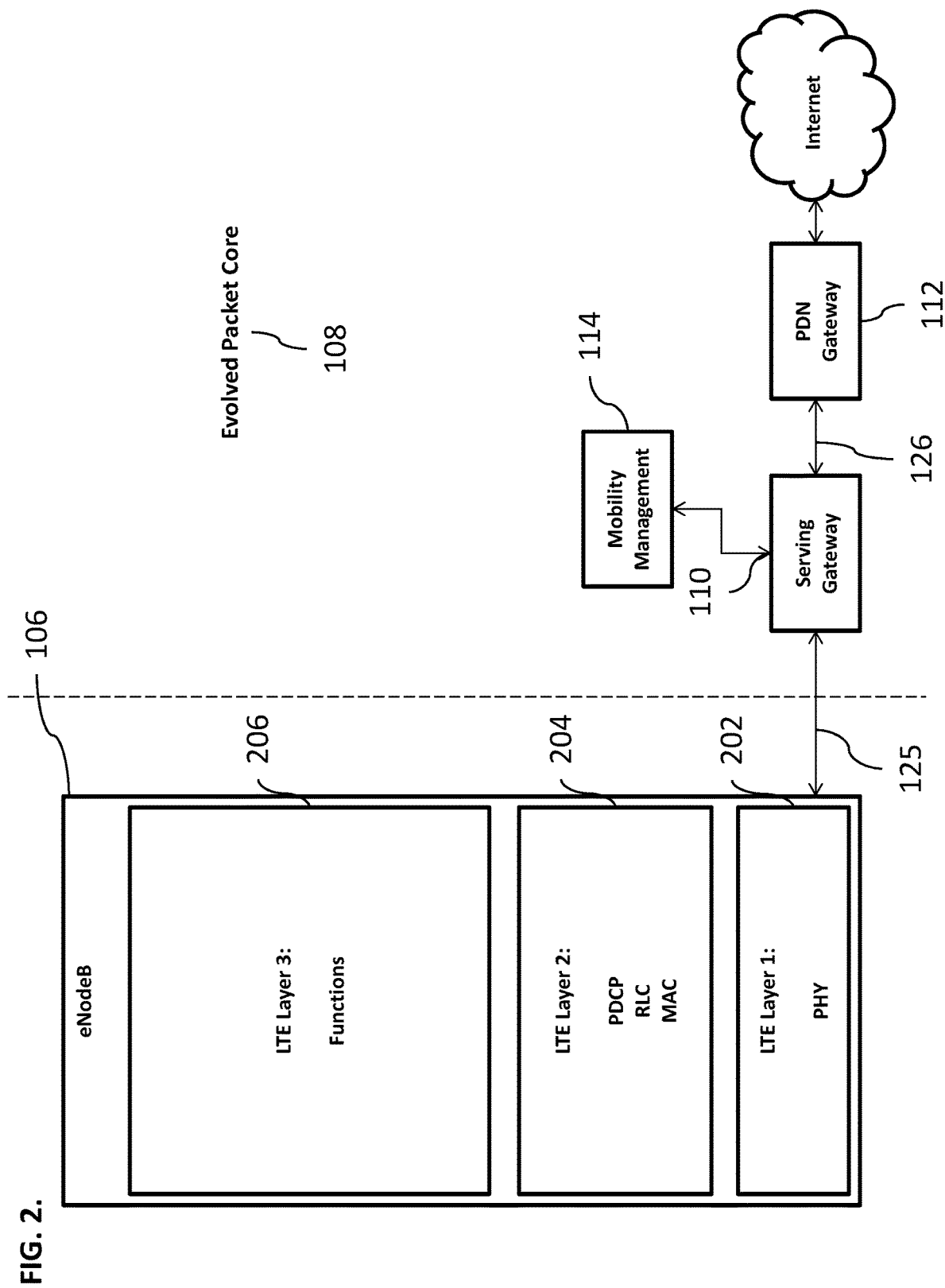
FIG. 2 illustrates further detail of an evolved Node B shown in FIGS. 1a-d.

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1d, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMEs and S-GWs. The eNodeB 106 selects an MME from a group of MMEs so the load can be shared by multiple MMEs to avoid congestion.

II. 5G NR Wireless Communications Networks

In some implementations, the current subject matter relates to a 5G new radio ("NR") communications system. The 5G NR is a next telecommunications standard beyond the 4G/IMT-Advanced standards. 5G networks offer at higher capacity than current 4G, allow higher number of mobile broadband users per area unit, and allow consumption of higher and/or unlimited data quantities in gigabyte per month and user. This can allow users to stream high-definition media many hours per day using mobile devices, even when not Wi-Fi networks. 5G networks have an improved support of device-to-device communication, lower cost, lower latency than 4G equipment and lower battery consumption, etc. Such networks have data rates of tens of megabits per second for a large number of users, data rates of 100 Mb/s for metropolitan areas, 1 Gb/s simultaneously to users within a confined area (e.g., office floor), a large number of simultaneous connections for wireless sensor networks, an enhanced spectral efficiency, improved coverage, enhanced signaling efficiency, 1-10 ms latency, reduced latency compared to existing systems.

Figure 3:
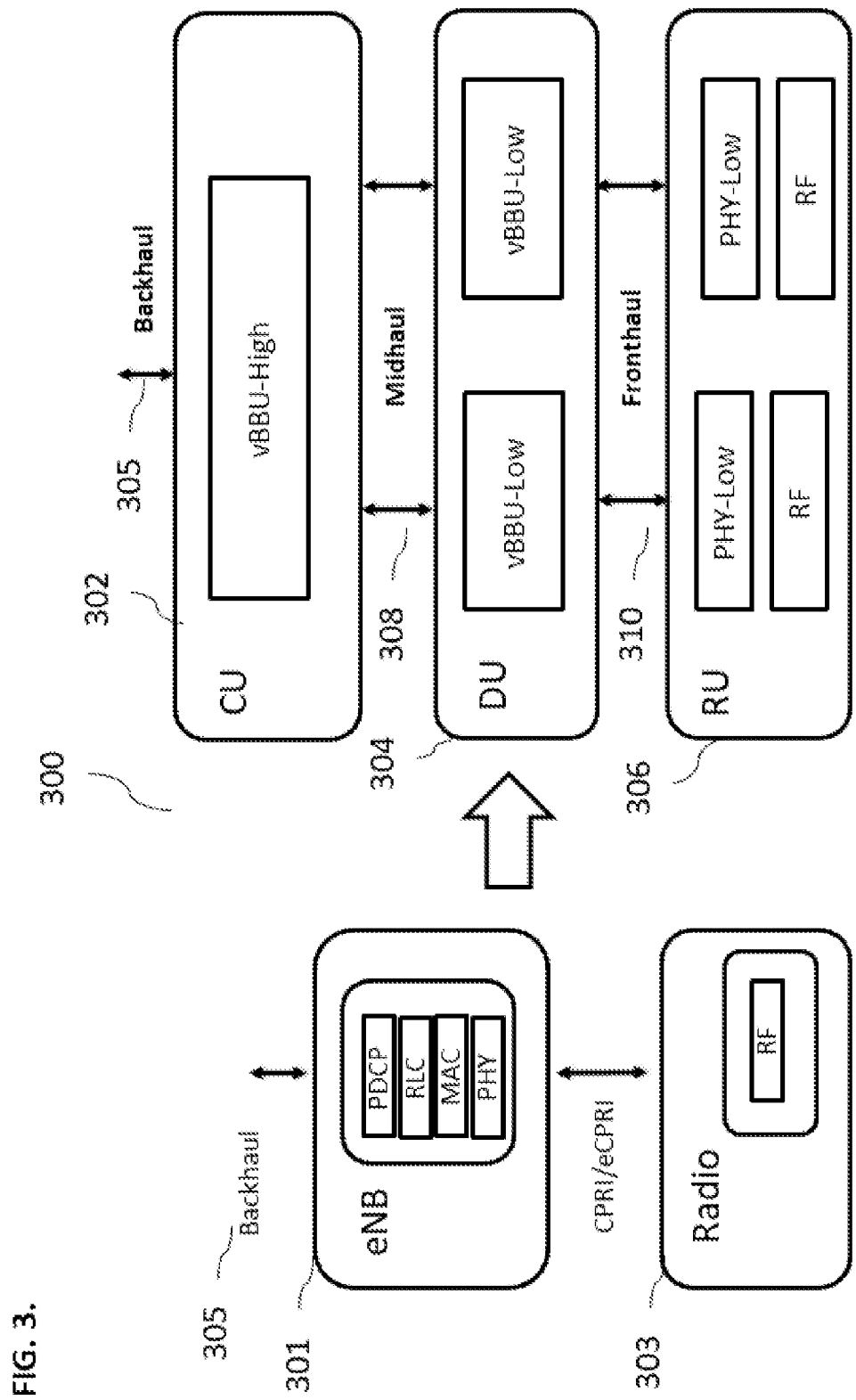
FIG. 3 illustrates an exemplary virtual radio access network, according to some implementations of the current subject matter.

FIG. 3 illustrates an exemplary virtual radio access network 300. The network 300 can provide communications between various components, including a base station (e.g., eNodeB, gNodeB) 301, a radio equipment 303, a centralized unit 302, a digital unit 304, and a radio device 306. The components in the system 300 can be communicatively coupled to a core using a backhaul link 305. A centralized unit ("CU") 302 can be communicatively coupled to a distributed unit ("DU") 304 using a midhaul connection 308. The radio frequency ("RU") components 306 can be communicatively coupled to the DU 304 using a fronthaul connection 310.

In some implementations, the CU 302 can provide intelligent communication capabilities to one or more DU units 304. The units 302, 304 can include one or more base stations, macro base stations, micro base stations, remote radio heads, etc. and/or any combination thereof.

In lower layer split architecture environment, a CPRI bandwidth requirement for NR can be 100 s of Gb/s. CPRI compression can be implemented in the DU and RU (as shown in FIG. 3). In 5G communications systems, compressed CPRI over Ethernet frame is referred to as eCPRI and is the recommended fronthaul interface. The architecture can allow for standardization of fronthaul/midhaul, which can include a higher layer split (e.g., Option 2 or Option 3-1 (Upper/Lower RLC split architecture)) and fronthaul with L1-split architecture (Option 7).

In some implementations, the lower layer-split architecture (e.g., Option 7) can include a receiver in the uplink, joint processing across multiple transmission points (TPs) for both DL/UL, and transport bandwidth and latency requirements for ease of deployment. Further, the current subject matter's lower layer-split architecture can include a split between cell-level and user-level processing, which can include cell-level processing in remote unit ("RU") and user-level processing in DU. Further, using the current subject matter's lower layer-split architecture, frequency-domain samples can be transported via Ethernet fronthaul, where the frequency-domain samples can be compressed for reduced fronthaul bandwidth.

Figure 4:
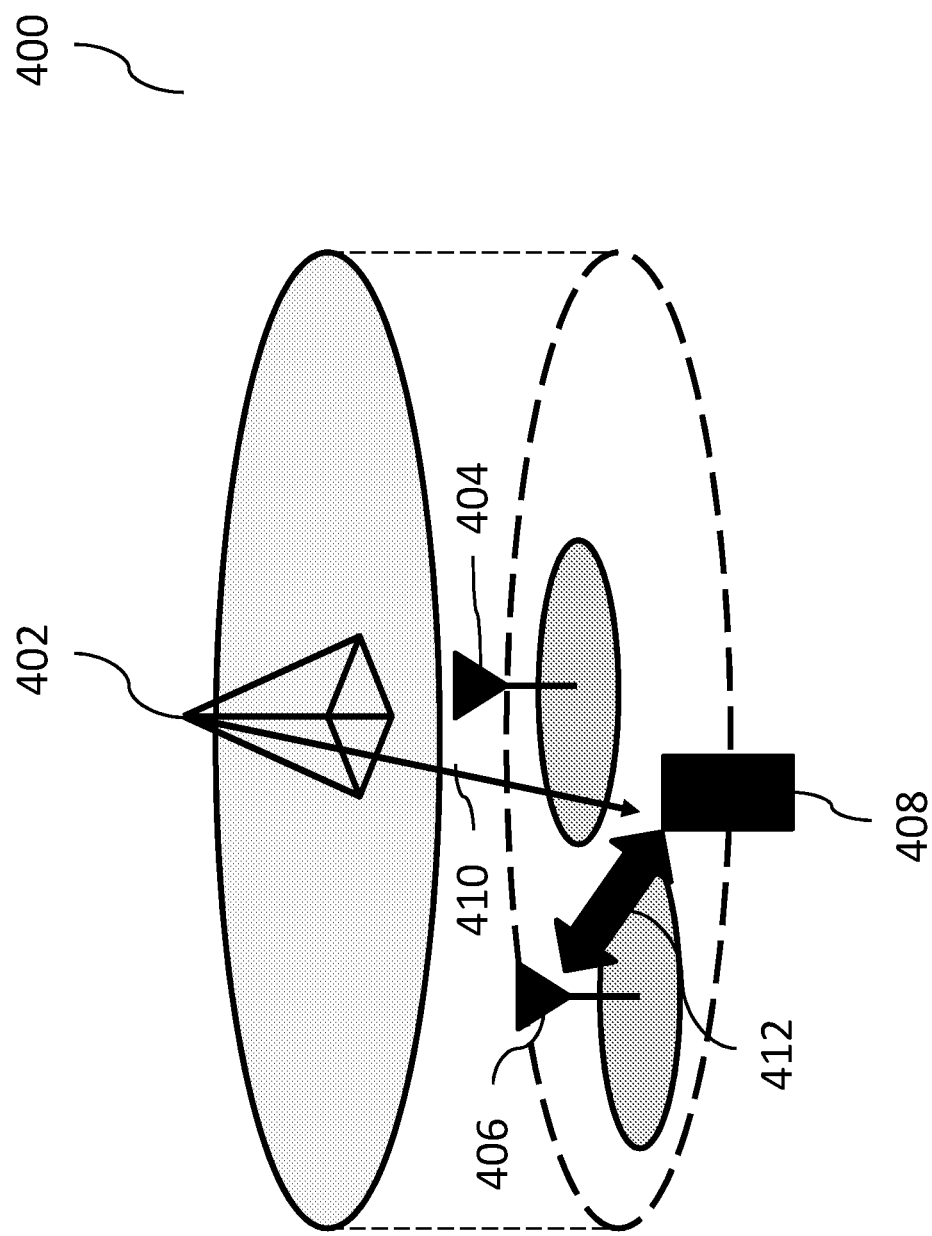
FIG. 4 illustrates an exemplary 3GPP split architecture to provide its users with use of higher frequency bands.

FIG. 4 illustrates an exemplary communications system 400 that can implement a 5G technology and can provide its users with use of higher frequency bands (e.g., greater than 10 GHz). The system 400 can include a macro cell 402 and small cells 404 and 406.

A mobile device 408 can be configured to communicate with one or more of the small cells 404, 406. The system 400 can allow splitting of control planes (C-plane) and user planes (U-plane) between the macro cell 402 and small cells 404, 406, where the C-plane and U-plane are utilizing different frequency bands. In particular, the small cells 402, 404 can be configured to utilize higher frequency bands when communicating with the mobile device 408. The macro cell 402 can utilize existing cellular bands for C-plane communications. The mobile device 408 can be communicatively coupled via U-plane 412, where the small cell (e.g., small cell 406) can provide higher data rate and more flexible/cost/energy efficient operations. The macro cell 402, via C-plane 410, can maintain good connectivity and mobility. Further, in some cases, LTE PUCCH and NR PUCCH can be transmitted on the same frequency.

Figure 5:
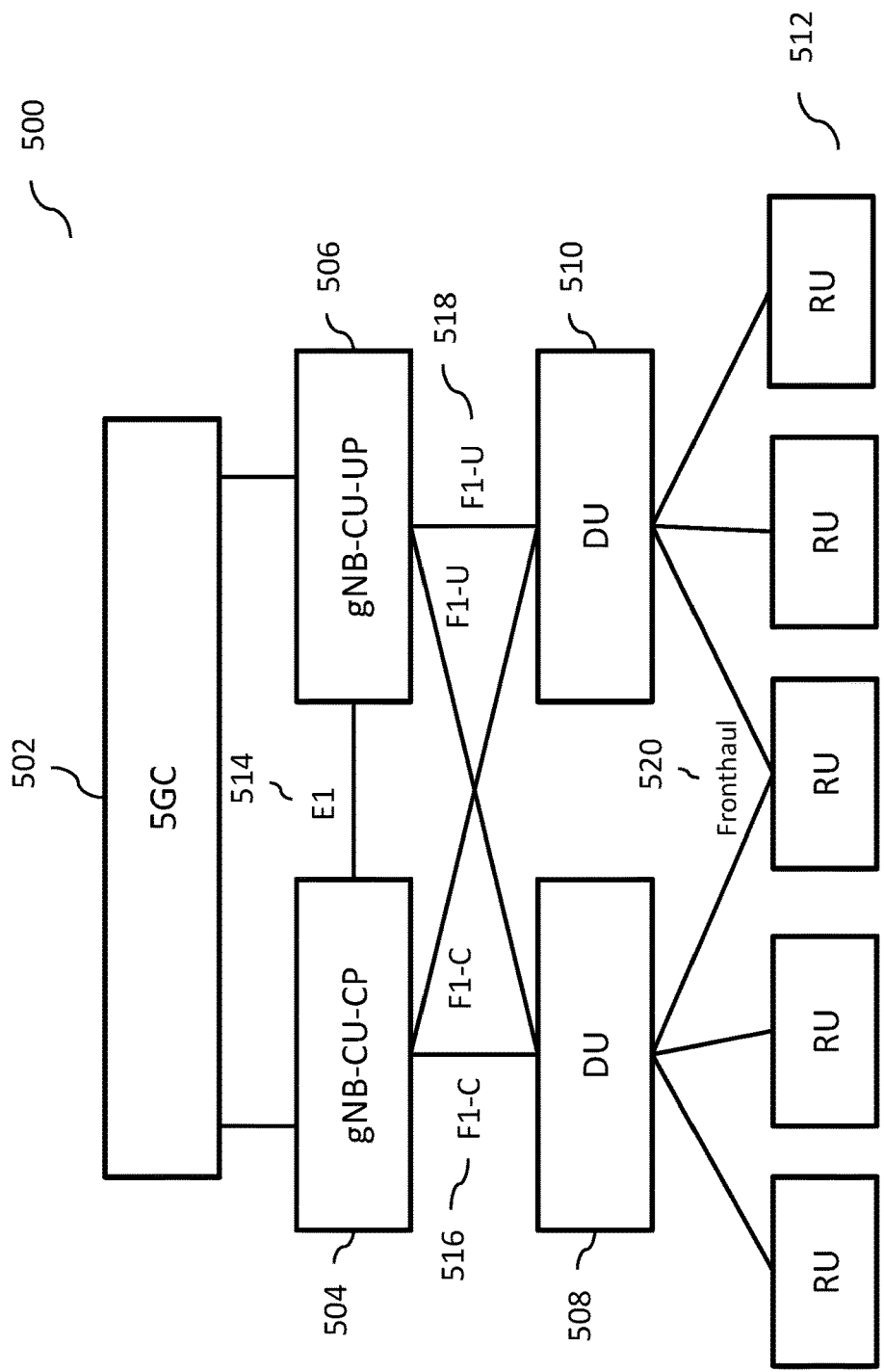
FIG. 5 illustrates an exemplary 5G wireless communication system.

FIG. 5 illustrates an exemplary 5G wireless communication system 500, according to some implementations of the current subject matter. The system 500 can be configured to have a lower layer split architecture in accordance with Option 7-2. The system 500 can include a core network 502 (e.g., 5G Core) and one or more gNodeBs (or gNBs), where the gNBs can have a centralized unit gNB-CU. The gNB-CU can be logically split into control plane portion, gNB-CU-CP, 504 and one or more user plane portions, gNB-CU-UP, 506. The control plane portion 504 and the user plane portion 506 can be configured to be communicatively coupled using an E1 communication interface 514 (as specified in the 3GPP Standard). The control plane portion 504 can be configured to be responsible for execution of the RRC and PDCP protocols of the radio stack.

The control plane and user plane portions 504, 506 of the centralized unit of the gNB can be configured to be communicatively coupled to one or more distributed units (DU) 508, 510, in accordance with the lower layer split architecture. The distributed units 508, 510 can be configured to execute RLC, MAC and upper part of PHY layers protocols of the radio stack. The control plane portion 504 can be configured to be communicatively coupled to the distributed units 508, 510 using F1-C communication interfaces 516, and the user plane portions 506 can be configured to be communicatively coupled to the distributed units 508, 510 using F1-U communication interfaces 518. The distributed units 508, 510 can be coupled to one or more remote radio units (RU) 512 via a fronthaul interface 520, which in turn communicate with one or more user equipment (not shown in FIG. 5). The remote radio units 512 can be configured to execute a lower part of the PITY layer protocols as well as provide antenna capabilities to the remote units for communication with user equipments (similar to the discussion above in connection with FIGS. 1a-2).

Figure 6:
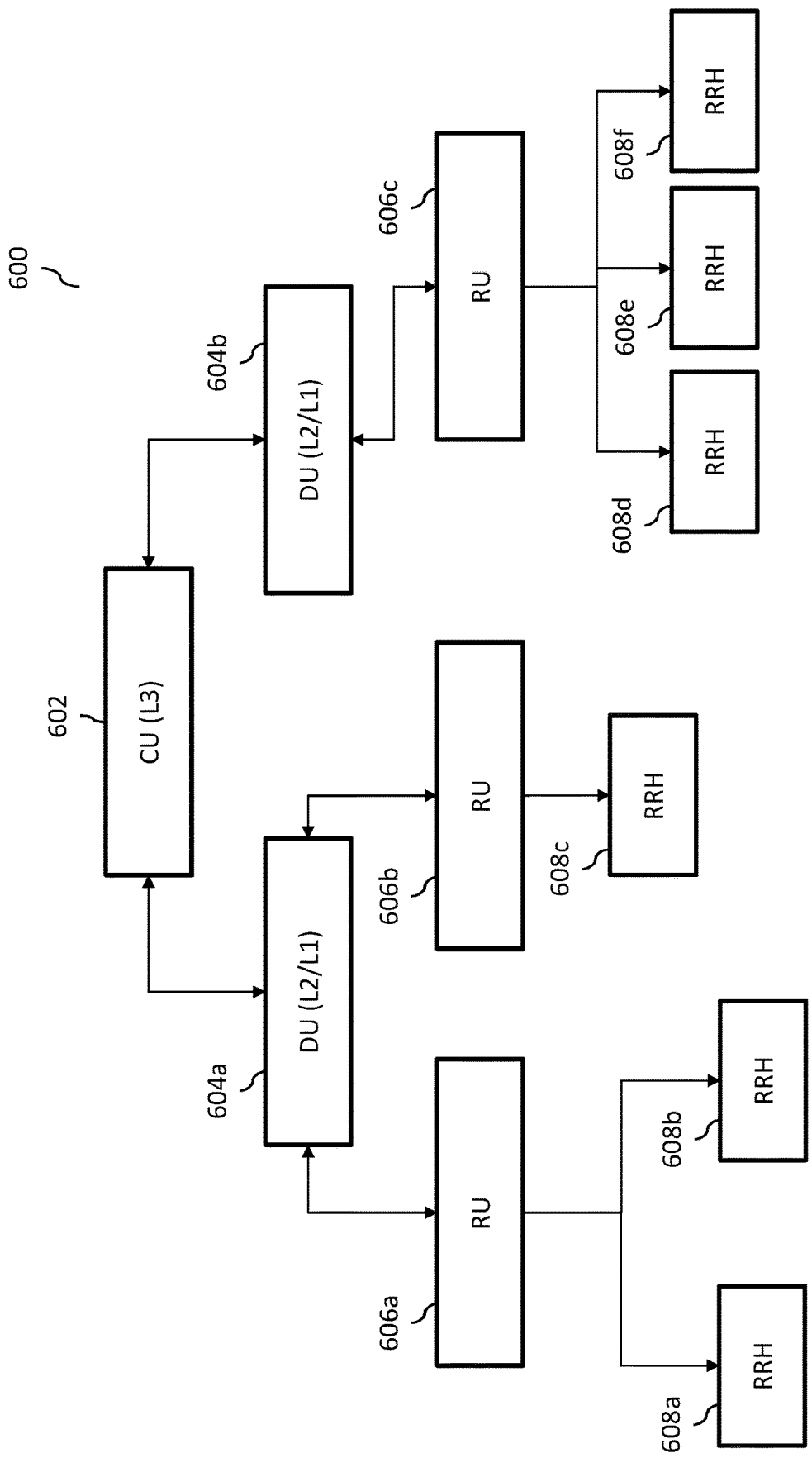
FIG. 6 illustrates a 5G wireless communication system, according to some implementations of the current subject matter.

FIG. 6 illustrates a 5G wireless communication system 600, according to some implementations of the current subject matter. The system 600 can be part of the system 500 shown in FIG. 5. The system 600 can be configured to include one or more centralized units (CU) 602, one or more distributed units (DU) 604 (a, b), one or more radio units (RU) 606 (a, b, c), and one or more remote radio heads (RRH) 608 (a, b, c, d, e, f). The units 602-608 can be communicatively coupled using one or more interfaces discussed above.

In some implementations, the CU 602 can be communicatively coupled to DU 604a and DU 604b. In turn, the distributed unit 604a can be communicatively coupled to the remote units 606a and 606b, whereby unit 606a can be coupled to two remote radio heads 608a and 608b and unit 606b can be coupled to one remote radio head 608c. The distributed unit 604b can be coupled to the remote unit 606c, which is in turn, coupled to three remote radio heads 608d, 608e, and 608e. The system 600 shown in FIG. 6 can be configured as a virtualized disaggregated radio access network (RAN) architecture, whereby layers L1, L2, L3 and radio processing can be virtualized and disaggregated in the centralized unit(s), distributed unit(s) and radio unit(s).

Figure 7A:
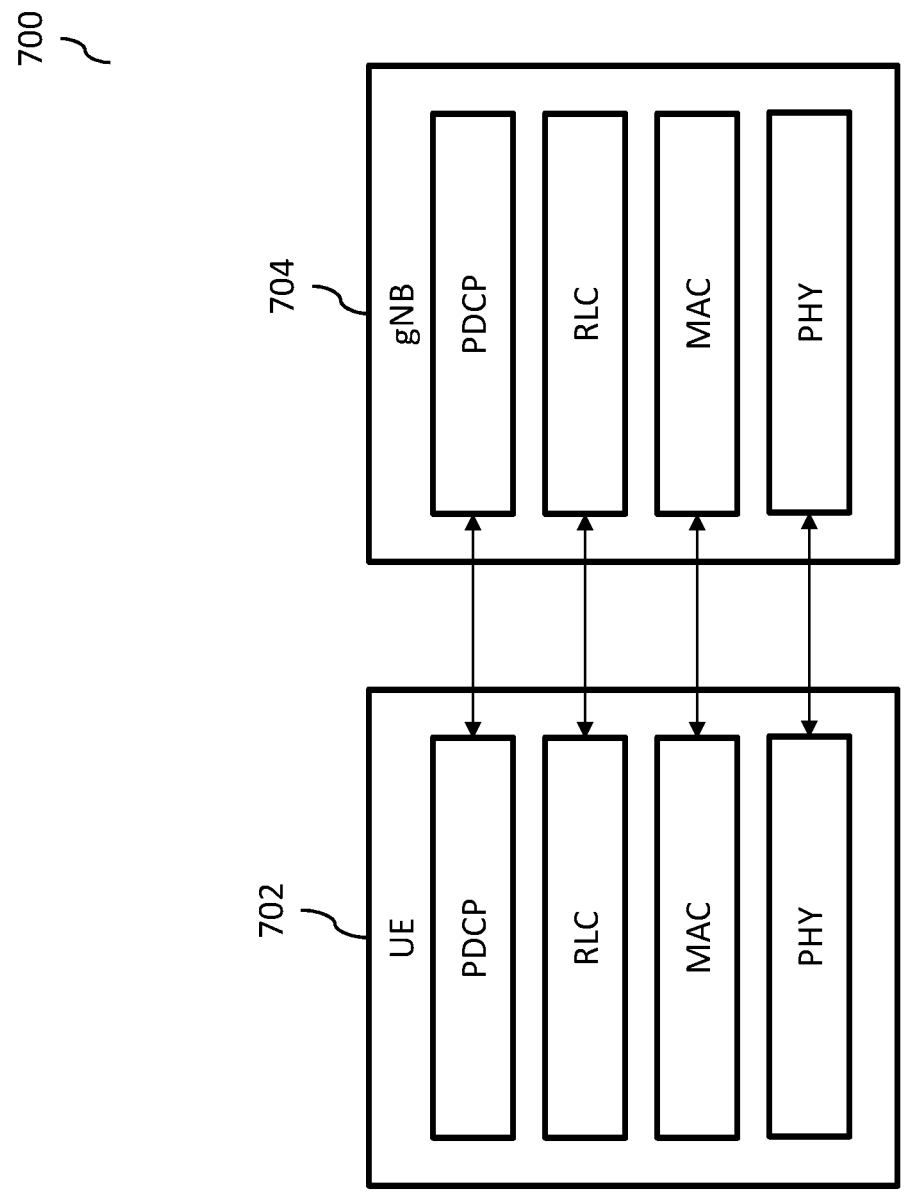
FIG. 7a illustrates a user plane protocol stack.
Figure 7B:
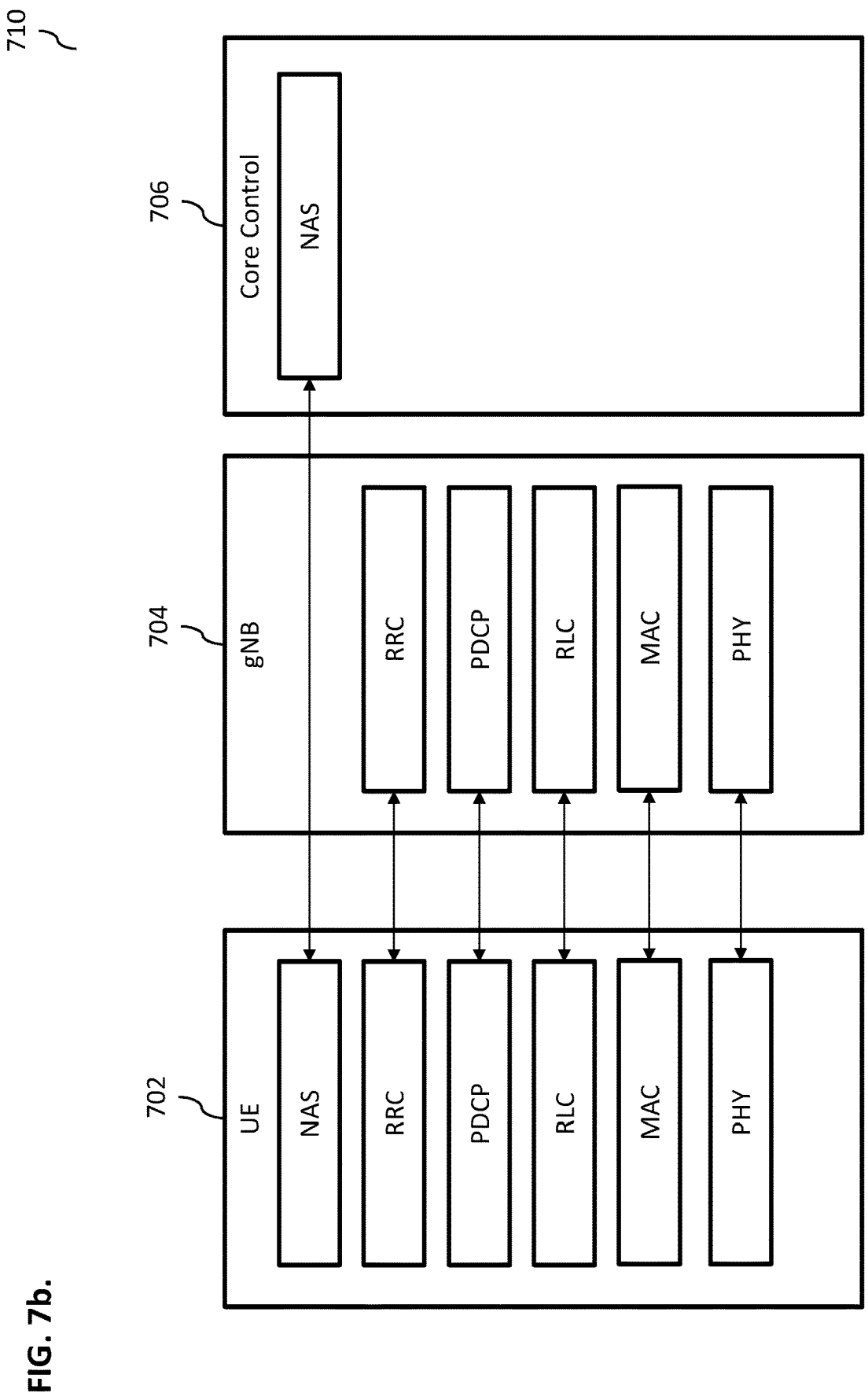
FIG. 7b illustrates a control plane protocol stack.

FIGS. 7a-b illustrate further details of an exemplary protocol stack in a 5G wireless communication system. In particular, FIG. 7a illustrates a user plane protocol stack 700 and FIG. 7b illustrates a control plane protocol stack 710. Portions of the protocol stack are illustrated for both an exemplary user equipment 702 and a base station (or portion thereof), e.g., gNodeB or gNB, 704. The user plane protocol stack 700 can include PHY, MAC, RLC and PDCP layers. The control plane protocol stack 710 can include PHY, MAC, RLC, PDCP, RRC, as well as a NAS (non-access stratum, a portion of which can be incorporated into a 5G core control network 706, as shown in FIG. 7b).

The protocol stack can include layer 1, layer 2 and layer 3. Layer 1 is PHYSICAL (PHY) layer. Layer 2 can include MAC, RLC and PDCP. Layer 3 is RRC layer as shown in FIGS. 7a-b.

Some of the functions of the PHY layer in 5G communications network can include error detection on the transport channel and indication to higher layers, FEC encoding/decoding of the transport channel, hybrid ARQ soft-combining, rate matching of the coded transport channel to physical channels, mapping of the coded transport channel onto physical channels, power weighting of physical channels, modulation and demodulation of physical channels, frequency and time synchronization, radio characteristics measurements and indication to higher layers, MIMO antenna processing, digital and analog beamforming, RF processing, as well as other functions.

The MAC sublayer of Layer 2 can perform beam management, random access procedure, mapping between logical channels and transport channels, concatenation of multiple MAC service data units (SDUs) belonging to one logical channel into transport block (TB), multiplexing/demultiplexing of SDUs belonging to logical channels into/from TBs delivered to/from the physical layer on transport channels, scheduling information reporting, error correction through HARQ, priority handling between logical channels of one UE, priority handling between UEs by means of dynamic scheduling, transport format selection, and other functions. The RLC sublayer's functions can include transfer of upper layer packet data units (PDUs), error correction through ARQ, reordering of data PDUs, duplicate and protocol error detection, re-establishment, etc. The PDCP sublayer can be responsible for transfer of user data, various functions during re-establishment procedures, retransmission of SDUs, SDU discard in the uplink, transfer of control plane data, and others.

Layer 3's RRC sublayer can perform broadcasting of system information to NAS and AS, establishment, maintenance and release of RRC connection, security, establishment, configuration, maintenance and release of point-point radio bearers, mobility functions, reporting, and other functions.

III. Real-Time Processing in Wireless Communications Systems

Figure 8:
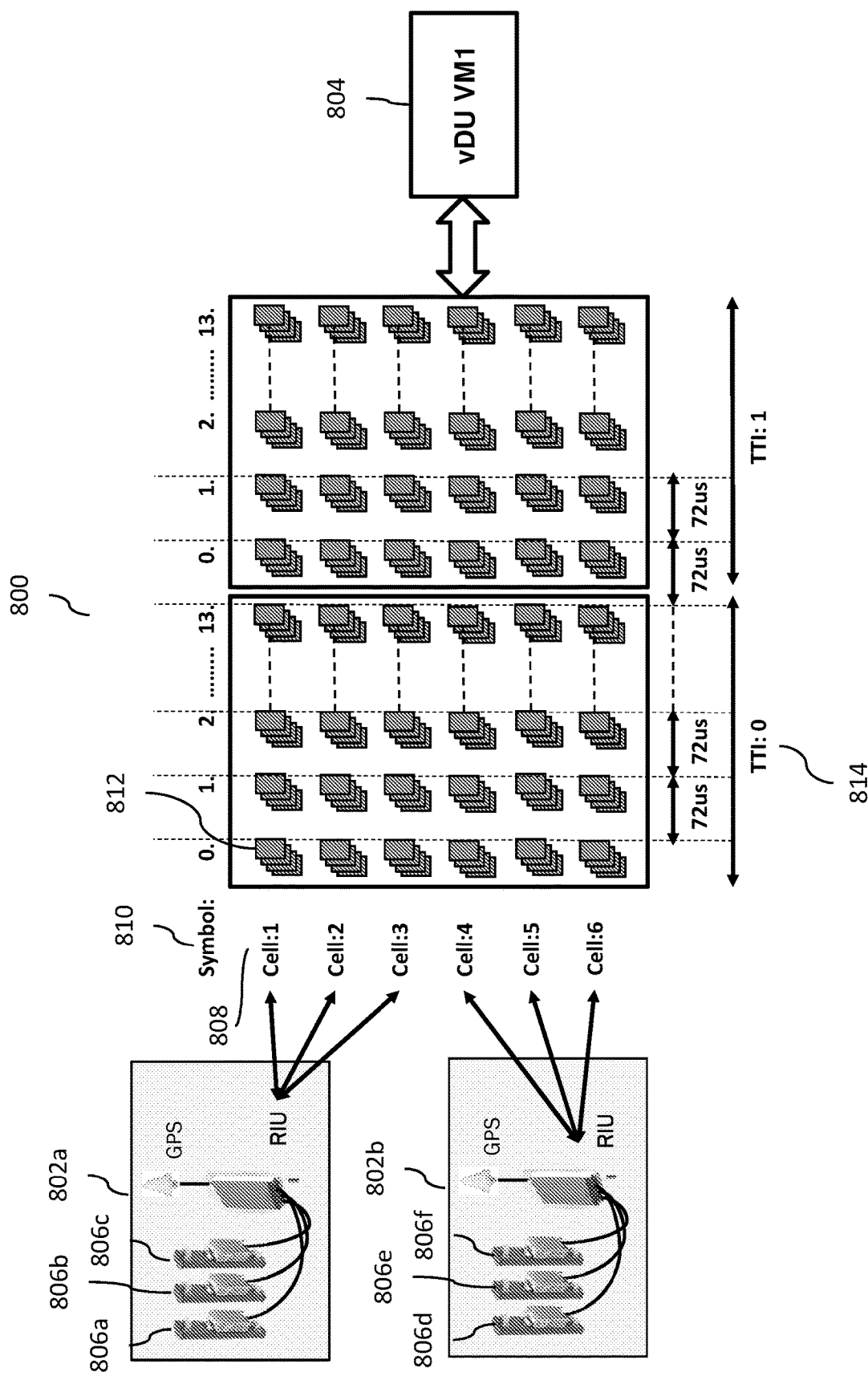
FIG. 8 illustrates an exemplary system for performing real-time processing of data (e.g., data packets), according to some implementations of the current subject matter.

In some implementations, the current subject matter can be configured to perform real-time processing of data in wireless communications systems, such as LTE, 5G NR, and/or any other wireless communications environments. FIG. 8 illustrates an exemplary system 800 for performing real-time processing of data (e.g., data packets), according to some implementations of the current subject matter. The system 800 can be incorporated in one or more systems described above in connection with FIGS. 1a-7b.

The system 800 can include one or more radio interface units 802 (*a, b*) that can provide an interface between one or more user equipments (not shown in FIG. 8) and one or more distributed units (DU) 804. The distributed units 804 can be virtualized distributed units (vDU) (as discussed above) and can operate as virtual machines (VM) and/or as containerized micro-services that can be executed in real-time on a host operating system (OS). As shown, for example, in FIG. 8, a vDU virtual machine 804 can be configured to interface with two radio interface units 802 (*a, b*). Each radio interface unit 802 can be configured to operate three respective antennas or sectors 806 (*a, b, c, d, e, f*). Thus, in the example shown in FIG. 8, the vDU virtual machine 804 can be configured to operate six sectors. As can be understood, other arrangements of the vDU virtual machine 804 and its operational capabilities are possible.

In some implementations, the interface between the vDU 804 and the radio interface units 802 can include an Ethernet interface that can be configured to for transmitting/receiving one or more data symbols 810 per antenna-carrier (AxC) for each cell 808 (as shown in FIG. 8, there are six cells 808 each with four transceivers and corresponding to the twenty four AxC antennas). For each transmission in each cell with a 1 milli-second subframe structure, there can be 14 symbol packets 812 that can be transmitted within each time transmission interval (TTI) 814. In each TTI 814, symbol packets 812 can be spaced 72 micro-seconds apart. As a result of such close spacing of symbols, signals can be transmitted/received at a low latency. To ensure that low latency is maintained, the vDU 804 can be configured to perform data packet processing in real-time or substantially in real-time.

As stated above, the vDU 804 can be executed on a physical host operating system, where the host operating system's processing components can be tuned to ensure that the low latency is maintained for each application being executed by the vDU 804. However, because host operating system includes a kernel (i.e., a computer program at the core of host operating system with complete control over everything in the system), periodically, the host may be configured to execute a big-lock or kernel-lock, which is a lock used in the kernel to provide concurrency control and/or other system management mode (SMM) operations that is typically required by symmetric multiprocessing (SMP) systems. If kernel big-lock is executed or conditions requiring an SMM are encountered, the vDU virtual machine 804 can be configured to exit and stop running (i.e., not transmitting/receiving data). The host operating system can take control over the system for a short period of time or an extended period of time. In the latter case, when the vDU virtual machine 804 resumes operation, it can observe a "stretch" or a gap in time between symbols/slots. Such "stretch" can imply an amount of time that has elapsed between a first time ("then") when the vDU virtual machine 804 took a last snapshot of the system time and stopped running and a second time ("now") when the vDU virtual machine 804 resumed operations. If the elapsed amount of time between first and second times is greater than a predetermined amount of time (e.g., hundreds of microseconds, etc.), the vDU virtual machine 804 can restart, as it cannot keep up with the real-time processing of data packets anymore.

Since one or more vDU virtual machines 804 may be associated with the same host operating system, actions (e.g., rebooting, restarting, etc.) executed by one vDU virtual machine may affect operations of another vDU virtual machine (e.g., causing it to reboot, restart, stop working, etc.). This may also cause the "stretch" to occur on the virtual machines. This scenario may be referred to as a "noisy neighbor" scenario. Additionally, stretches may be caused by various errors, including virtual machine re-mapping errors, deployment issues, instantiation issues of virtual machines, testing protocol executed at the host operating systems, as well as other issues.

Some exemplary "stretch" conditions can include, but, are not limited to, testing of port redundancy for a multi-haul port in a base station. Such testing can generate a real-time processing latency of the active vDU virtual machines on a non-uniform memory access node or across non-uniform memory access nodes. This causes vDU virtual machine to exceed its 1 ms latency for LTE processing and, thus, encounter an instability, thereby resulting in the "stretch" condition.

Other exemplary "stretch" conditions can include restarting a virtualized signal processing unit on a neighboring virtual machine on the same non-uniform memory access node or on the adjacent non-uniform memory access node of the same server served by the same host OS in SMP mode of operation. Restarting generates an error in the kernel logs that indicates that the virtual function port associated with the vDU virtual machine that is being re-initialized is still in reset. This causes the neighboring virtual machine that was operational to experience an instability.

Additional examples of the "stretch" can include rebooting a neighboring vDU virtual machine (e.g., operating system level reboot). This affects other vDU virtual machines on the same non-uniform memory access node. This is because the same operating system is shared between the non-uniform memory access nodes (i.e., sockets) on the same server, this type of vDU virtual machine reboot can cause problems to all vDU virtual machines on the node(s).

Further, "stretch" conditions may be caused by a direct memory access (DMA) remapping error generated by the host operating system, as seen in the kernel logs. When this happens, all vDU virtual machines on that server can experience an instability.

Moreover, vDU virtual machine instantiation can trigger noisy neighbor problem on other operational vDU virtual machines, because the underlying host operating system as well as other components are the same for the entire server. As can be understood, other conditions can trigger interruptions in operations in one or more vDU virtual machines.

Figure 9:
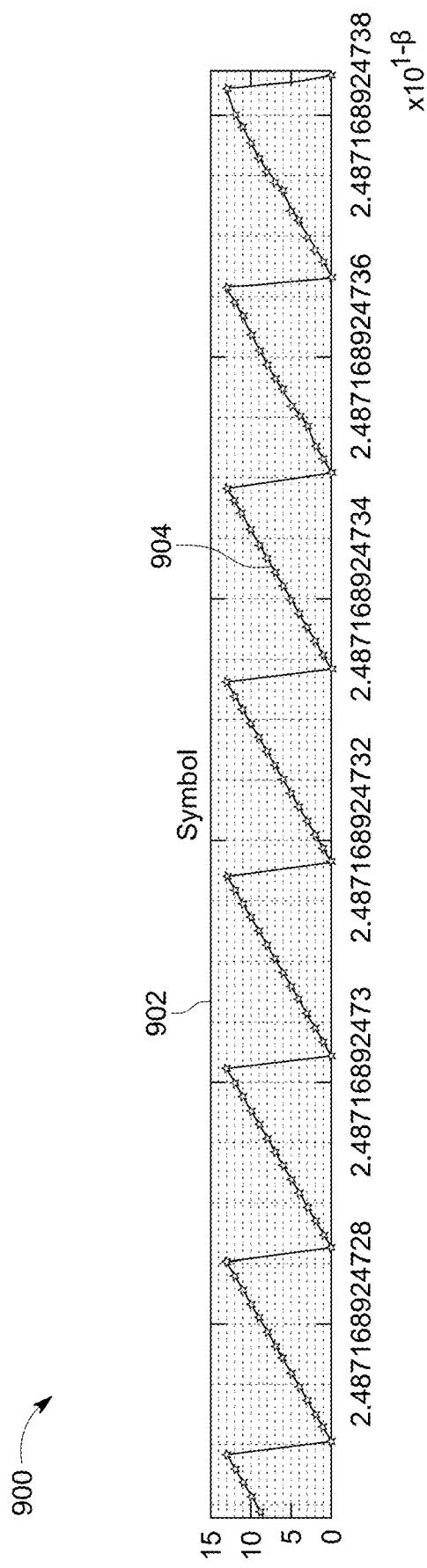
FIG. 9 illustrate an exemplary plot illustrating processing of symbol packets.

FIG. 9 illustrate an exemplary plot 900 illustrating processing of symbols. As shown in FIG. 9, there are 14 symbols (e.g., corresponding to 14 symbols shown in FIG. 8) that are being processed during each transmission interval 902. The processing of the symbols appears smooth until an interrupt or a stretch is detected at 904. At that point, processing is no longer smooth (e.g., as shown by the jagged edges on the plot).

In some implementations, the current subject matter can provide a mechanism to detect "stretch" latency between the first time (e.g., "then" or prior to detection of an event) and the second time (e.g., "now" or after the detection of the event). The mechanism can be implemented in the vDU, for example, as part of its software layers, and can provide a way to handle such stretches without interruptions (e.g., to the stream of fronthaul packets using the interface between the vDU 804 and the RIUs 802) and maintaining real-time or substantially real-time processing by the vDU virtual machine.

In some implementations, the RIUs 804 can include a resiliency mechanism, which can be configured to generate a dummy symbol packet upon failure to receive a symbol packet for a particular antenna-carrier (AxC) for a particular sector. Such dummy packet can be configured to keep the CPRI interface towards the remote radio unit (RRU) synchronized. This can also ensure that the radio interface unit 802 to radio CPRI interface is always synchronized.

In some implementations, upon detection of a condition of "stretch" (e.g., rebooting of another vDU virtual machine, etc.), the vDU 804 can be configured to skip processing of one or more symbols that would be normally generated during one or more transmission time intervals (TTIs). Subsequent to the skipping, the vDU 804 can be configured to attempt to resynchronize with the radio interface unit 802. The re-synchronization attempt can be executed after a predetermined period of time that would be equivalent to the number of TTIs skipped. For example, the vDU 804, upon detection of the "stretch" condition (e.g., corresponding to the "then" point in time), can be configured to skip processing of symbols during 2 transmission time intervals. This means that the vDU 804 would skip processing symbols for approximately 2 milliseconds and attempt to resynchronize with the TIU 802 after approximately 2 milliseconds. In some exemplary, non-limiting implementations, the vDU 804 can be configured to skip processing of symbols during a 5 millisecond interval and attempt to resynchronize with the RIU 802 after 5 milliseconds. As can be understood, any other period of time (smaller or larger than 2 or 5 milliseconds) can be used for the purposes of skipping of processing of symbols and attempt at resynchronization.

Such skipping can ensure that a particular sector can remain operational after the predetermined period of time due to the detected "stretch". This is a non-intrusive procedure and does not affect the RRC connected states of the UEs in a particular sector(s). This means that that sector can remain operations and the user equipments can remain connected within that sector.

Figure 10:
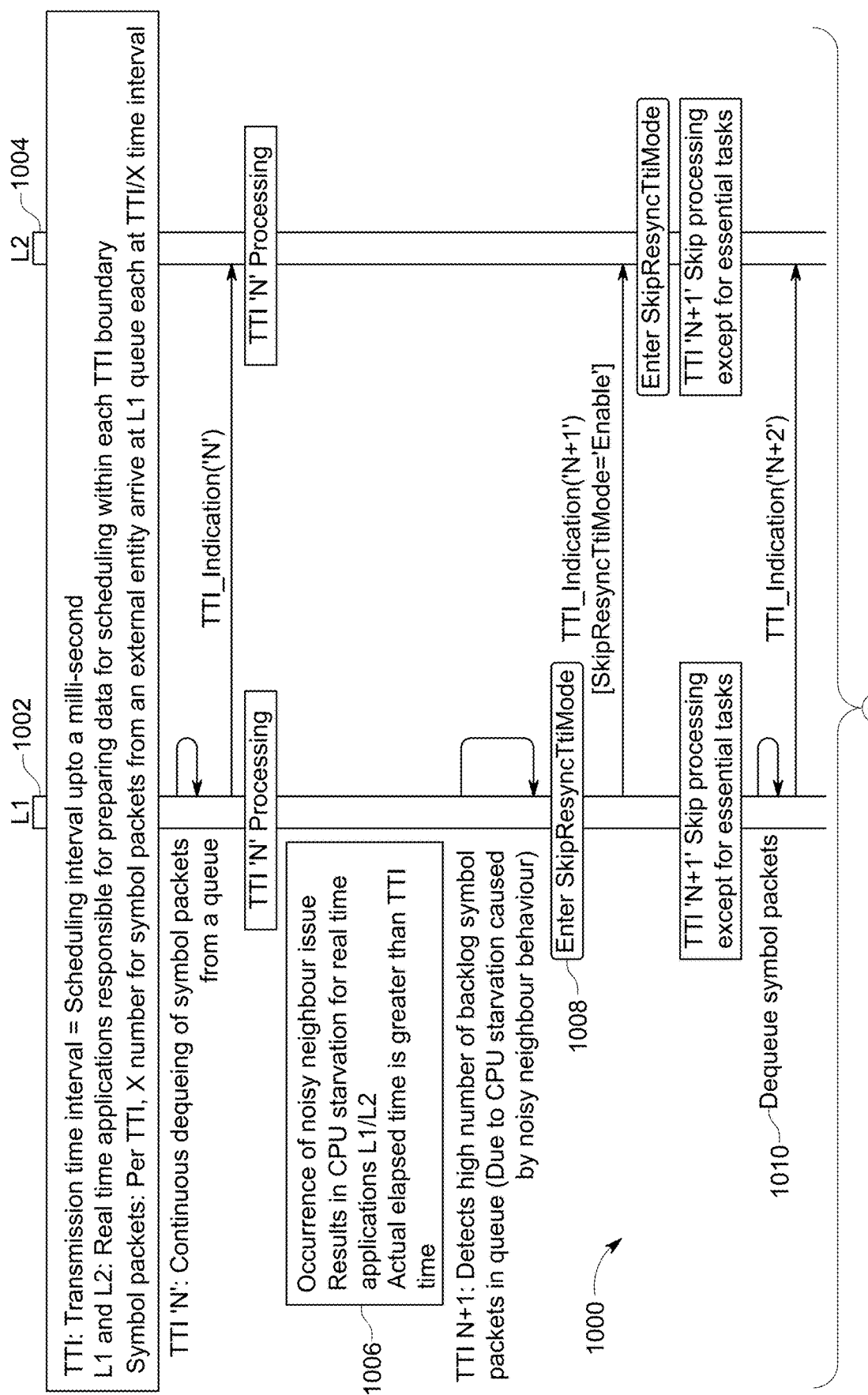
FIG. 10 illustrate an exemplary process for handling conditions detected by one or more virtual machines executed on a host operating system of a virtualized distributed unit of a base station, according to some implementations of the current subject matter.
Figure 10:
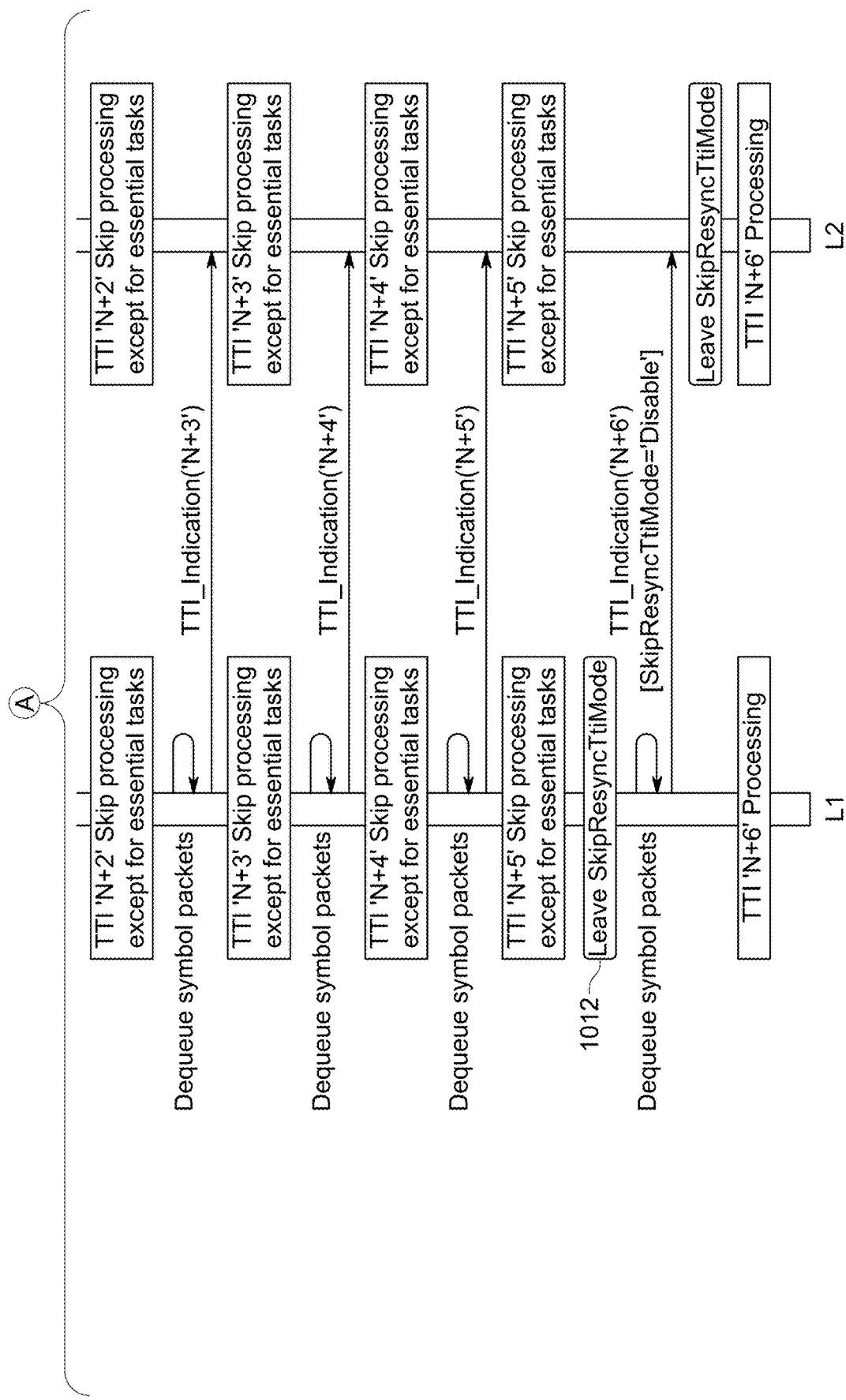

FIG. 10 illustrate an exemplary process 1000 for handling conditions detected by one or more virtual machines executed on a host operating system of a virtualized distributed unit of a base station, according to some implementations of the current subject matter. The process 1000 may be executed between components of Layer 1 1002 and Layer 2 1004. Layers 1 and 2 can be responsible for preparing data for scheduling within each transmission time interval (TTI), which can be, for example, up to 1 millisecond. As stated above, there are a predetermined number of symbol packets that can be received from an external entity and that can be received at Layer 1 queue during each TTI.

During normal operation, once packets arrive at Layer 1 1002 and processed, they can be de-queued from Layer 1 queue. Layer 1 can then transmit an indication of TTI (e.g., TTI_Indication('N'), where N can correspond to a particular TTI) to Layer 2 1004 so that Layer 2 can perform appropriate processing.

At 1006, Layer 1 1002 can detect one or more interrupt scenarios, as for example, discussed above. This can result in CPU starvation for real-time applications in Layer 1/Layer 2, whereby actual elapsed time can be greater than the TTI time. Upon this occurrence, Layer 1 1002, at time N+1 can detect a high number of backlog (e.g., unprocessed/not de-queued) symbol packets in the queue. Layer 1 can, at 1008, then enter a skip/resynch TTI mode and provide an appropriate indication to Layer 2 (e.g., TTI_Indication('N+1') [SkipResynchTTIMode='Enable']), so that Layer 2 can also enter this mode.

At 1010, Layer 1 can initiate a resiliency mode (e.g., as discussed above generation of a dummy symbol packet upon failing to receive a symbol packet for a specific AxC for a particular sector) and can skip processing of the symbol TTIs, however can continue to de-queue symbol packets. Layer 1 can still continue processing of essential tasks. Layer 2 can do the same tasks. Moreover, Layers 1 and 2 can continue to do the same for the next predetermined number of TTIs (as shown, for example, in FIG. 10, there are five TTIs that can be skipped). At each, next TTIs skipping, Layer 1 can transmit an appropriate notification to Layer 2 to inform it that skipping of the TTI processing is to be performed (e.g., TTI_Indication('N+2'), TTI_Indication ('N+3'), TTI_Indication('N+4'), TTI_Indication('N+5')).

At 1012, Layer 1 can exit the skip/resynch TTI mode, dequeue symbol packets, and inform Layer 2 that it is existing this mode (e.g., TTI_Indication('N+6') [SkipResynchTTIMode='Disable']), so that Layer 2 can also exit this mode. At this point, Layer 1 and Layer 2 can return to normal symbol processing.

Figure 11:
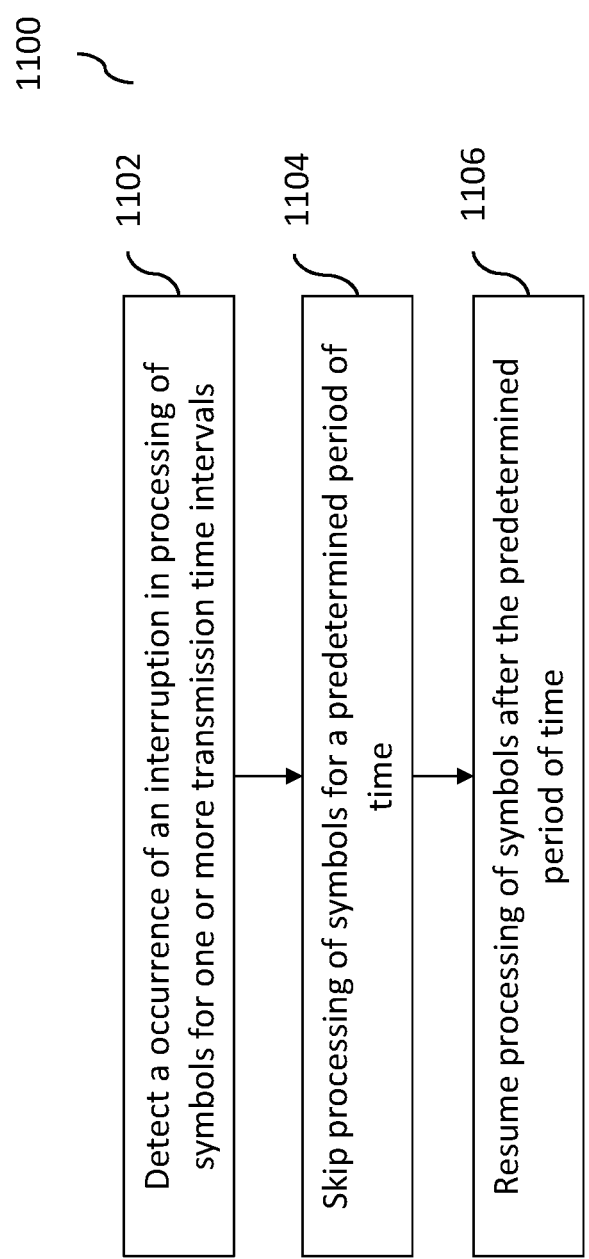
FIG. 11 illustrates an exemplary process for maintaining real-time (or substantially real-time) processing of symbols in a wireless communication system, according to some implementations of the current subject matter.

FIG. 11 illustrates an exemplary process 1100 for maintaining real-time (or substantially real-time) processing of symbols in a wireless communication system, according to some implementations of the current subject matter. The process 1100 may be performed by one or more components of a distributed unit and/or virtualized distributed unit. In some exemplary implementations, the process 1100 may be executed by a host operating system of a distributed unit that may be configured to host one or more virtual machines. At 1102, one or more vDU virtual machines can be configured to detect occurrence of an interruption in processing of symbols during one or more transmission time intervals (e.g., as shown in FIG. 9). The interruption can be a result from one or more scenarios discussed above.

At 1104, the vDU virtual machine experiencing interruption can be configured to skip processing of symbols for a predetermined period of time. The predetermined period of time can corresponding to one or more transmission time intervals (TTIs) during which processing of symbols occurs. During the skipping, one or more components of the Layer 1 can be configured to de-queue any symbol packets, but continue processing of essential tasks (as discussed above with regard to FIG. 10).

At 1106, after expiration of the predetermined period of time, the vDU virtual machine can return to the normal processing of symbol packets.

Figure 12:
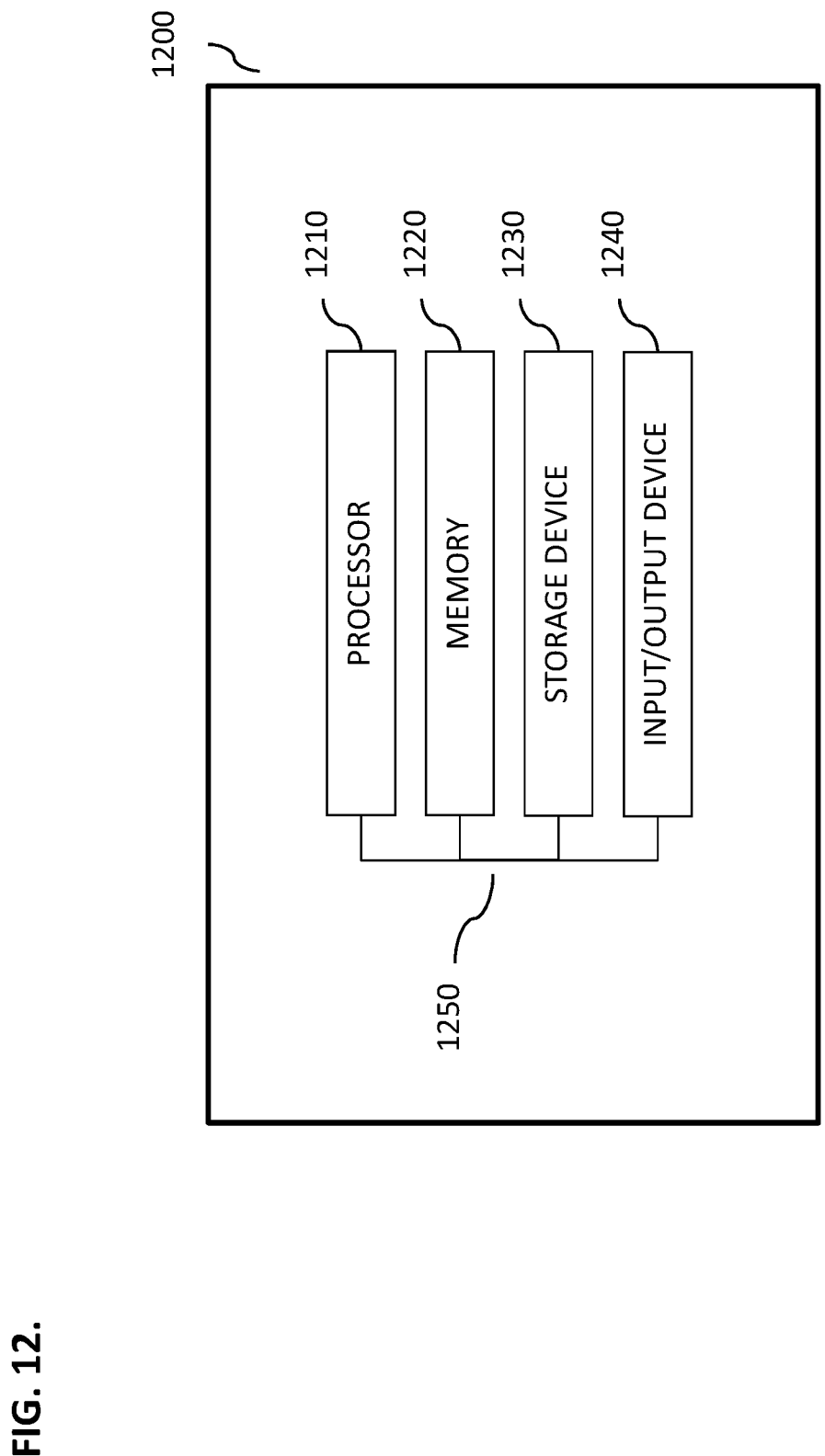
FIG. 12 illustrates an exemplary system, according to some implementations of the current subject matter.

In some implementations, the current subject matter can be configured to be implemented in a system 1200, as shown in FIG. 12. The system 1200 can include one or more of a processor 1210, a memory 1220, a storage device 1230, and an input/output device 1240. Each of the components 1210, 1220, 1230 and 1240 can be interconnected using a system bus 1250. The processor 1210 can be configured to process instructions for execution within the system 600. In some implementations, the processor 1210 can be a single-threaded processor. In alternate implementations, the processor 1210 can be a multi-threaded processor. The processor 1210 can be further configured to process instructions stored in the memory 1220 or on the storage device 1230, including receiving or sending information through the input/output device 1240. The memory 1220 can store information within the system 1200. In some implementations, the memory 1220 can be a computer-readable medium. In alternate implementations, the memory 1220 can be a volatile memory unit. In yet some implementations, the memory 1220 can be a non-volatile memory unit. The storage device 1230 can be capable of providing mass storage for the system 1200. In some implementations, the storage device 1230 can be a computer-readable medium. In alternate implementations, the storage device 1230 can be a floppy disk device, a hard disk device, an optical disk device, a tape device, non-volatile solid state memory, or any other type of storage device. The input/output device 1240 can be configured to provide input/output operations for the system 1200. In some implementations, the input/output device 1240 can include a keyboard and/or pointing device. In alternate implementations, the input/output device 1240 can include a display unit for displaying graphical user interfaces.

Figure 13:
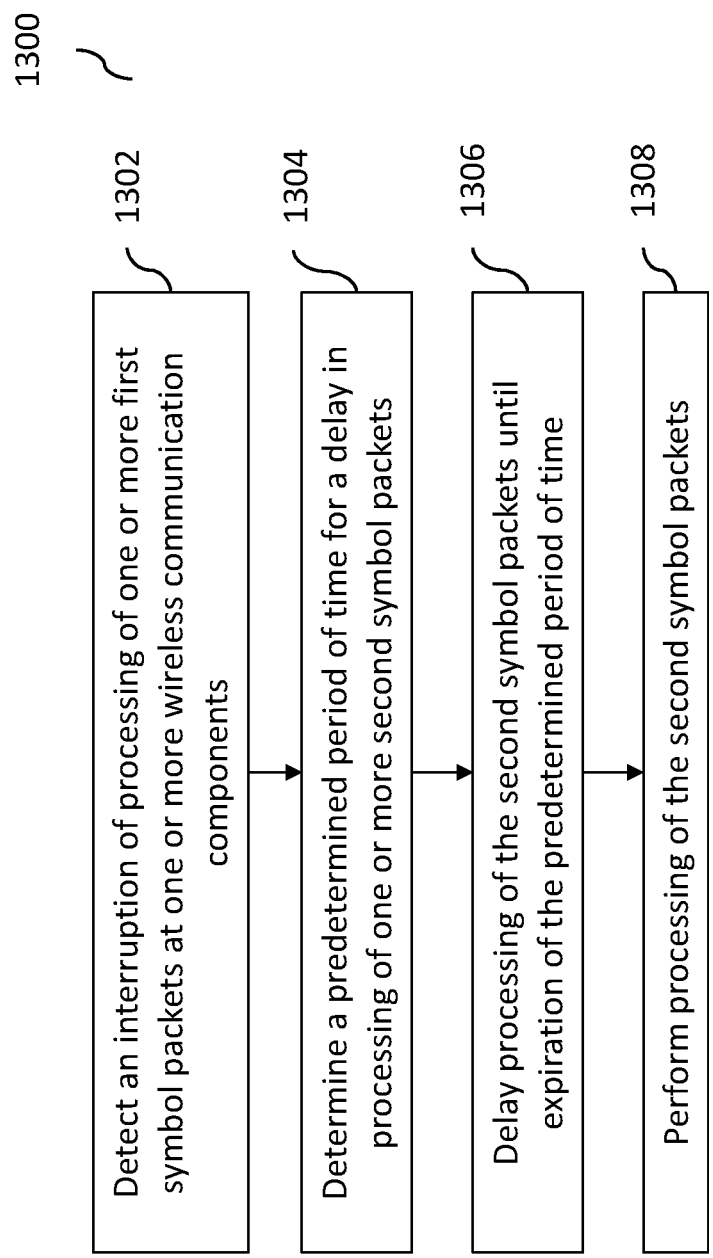
FIG. 13 illustrates an exemplary method, according to some implementations of the current subject matter.

FIG. 13 illustrates an exemplary method 1300, according to some implementations of the current subject matter. The process 1300 can be performed by the system 800 shown in FIG. 8. At 1302, an interruption of processing of one or more first symbol packets at one or more wireless communication components can be detected. The interruption can be caused by a "noisy neighbor" (e.g., one virtual machine restarting on a host operating system causing other virtual machines to restart). The communication components can include a virtualized distributed unit. At 1304, a predetermined period of time (e.g., 2 TTIs, 5 TTIs, etc.) for a delay in processing of one or more second symbol packets can be determined. The second symbol packets can be processed after the packets for the first symbol are de-queued/discarded. At 1306, processing of the second symbol packets can be delayed until expiration of the predetermined period of time. At 1308, processing of the second symbol packets can be resumed.

In some implementations, the current subject matter can include one or more of the following optional features. In some implementations, at least one of the detecting, the determining, the delaying, and the resuming can be performed by a base station. The base station can include at least one of the following communication components: one or more remote radio units, one or more radio interface units, and one or more distributed units. The distributed units can be configured to interface with the radio interface units for processing of the first and second symbol packets.

In some implementations, the distributed units can be one or more virtualized distributed units. The virtualized distributed units can correspond to one or more virtual machines being executed on a host operating system.

In some implementations, a first virtual machine can be configured to detect the interruption upon a restarting of a second virtual machine on the same host operating system.

In some implementations, the predetermined period of time can be determined based on a multiple of a transmission time interval corresponding to a time for transmitting symbol packets between the virtualized distributed units and the radio interface units. For example, the predetermined period of time can be 2 milliseconds. Alternatively, the predetermined period of time can be 5 milliseconds. In some implementations, the predetermined period of time can be N milliseconds (during which monitoring, detection and correction without service disruption may be performed), where N can correspond to an amount of time after which the end user equipment can begin to notice service degradation and/or service interruption. In some exemplary, non-limiting implementations, N can be as high as hundreds (100 s) of milliseconds.

In some implementations, the delaying can include de-queuing the first symbol packets from a processing queue. The first symbol packets can be de-queued and discarded by at least one of Layer 1 and Layer 2 of a wireless communication device receiving the first symbol packets.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims

What is claimed:

1. A computer-implemented method, comprising:
   detecting, via a base station comprising one or more communication components, an interruption of processing of one or more first symbol packets at the one or more communication components;
   determining a period of time for a delay in processing of one or more second symbol packets;
   delaying processing of the one or more second symbol packets based on the determined period of time wherein the delaying includes de-queueing the one or more first symbol packets from a processing queue; and
   processing the one or more second symbol packets after expiration of the determined period of time,
   wherein at least one of the determining, the delaying, and the processing is performed via the base station,
   wherein the one or more-communication components of the base station comprises at least one of: one or more remote radio units, one or more radio interface units, and one or more distributed units, and
   wherein the one or more distributed units is one or more virtualized distributed units, the one or more virtualized distributed units corresponding to one or more virtual machines being executed on a host operating system.

2. The method according to claim 1, wherein the one or more distributed units is configured to interface with the one or more radio interface units for processing of the one or more first and second symbol packets.

3. The method according to claim 1, wherein a first virtual machine in the one or more virtual machines is configured to detect the interruption upon a restarting of a second virtual machine in the one or more virtual machines.

4. The method according to claim 1, wherein the determined period of time is determined based on a multiple of a transmission time interval corresponding to a time for transmitting symbol packets between the one or more virtualized distributed units and the one or more radio interface units.

5. The method according to claim 4, wherein the determined period of time is 2 milliseconds.

6. The method according to claim 4, wherein the determined period of time corresponds to a period of time after which at least one of a service degradation and a service interruption is detected by a user equipment communicating with the base station.

7. The method according to claim 1, wherein the one or more first symbol packets is de-queued and discarded by at least one of Layer 1 and Layer 2 of a wireless communication device receiving the one or more first symbol packets.

8. An apparatus comprising:
   at least one programmable processor; and
   a non-transitory machine-readable medium storing instructions that, when executed by the at least one programmable processor, cause the at least one programmable processor to perform operations comprising:

detecting, via a base station comprising one or more communication components, an interruption of processing of the one or more first symbol packets at the one or more communication components;

determining a period of time for a delay in processing of one or more second symbol packets;

delaying processing of the one or more second symbol packets based on the determined period of time, wherein the delaying includes de-queueing the one or more first symbol packets from a processing queue; and processing the one or more second symbol packets after expiration of the determined period of time, wherein at least one of the detecting, the determining, the delaying, and the processing is performed via the base station, wherein the one or more communication components of the base station comprises at least one of: one or more remote radio units, one or more radio interface units, and one or more distributed units, and wherein the one or more distributed units is one or more virtualized distributed units, the one or more virtualized distributed units corresponding to one or more virtual machines being executed on a host operating system.

9. The apparatus according to claim 8, wherein the one or more distributed units is configured to interface with the one or more radio interface units for processing of the one or more first and second symbol packets.

10. The apparatus according to claim 8, wherein a first virtual machine in the one or more virtual machines is configured to detect the interruption upon a restarting of a second virtual machine in the one or more virtual machines.

11. The apparatus according to claim 8, wherein the determined period of time is determined based on a multiple of a transmission time interval corresponding to a time for transmitting symbol packets between the one or more virtualized distributed units and the one or more radio interface units.

12. The apparatus according to claim 11, wherein the determined period of time is 2 milliseconds.

13. A computer program product comprising a non-transitory machine-readable medium storing instructions that, when executed by at least one programmable processor, cause the at least one programmable processor to perform operations comprising:

detecting, via a base station comprising one or more communication components, an interruption of processing of one or more first symbol packets at the one or more wireless communication components;

determining a period of time for a delay in processing of one or more second symbol packets;

delaying processing of the one or more second symbol packets based on the determined period of time, wherein the delaying includes de-queueing the one or more first symbol packets from a processing queue; and processing the one or more second symbol packets after expiration of the determined period of time, wherein at least one of the detecting, the determining, the delaying, and the processing is performed via the base station, wherein the one or more communication components of the base station comprises at least one of: one or more remote radio units, one or more radio interface units, and one or more distributed units, and wherein the one or more distributed units is one or more virtualized distributed units, the one or more virtualized distributed units corresponding to one or more virtual machines being executed on a host operating system.

* * * * *